United States Patent [19]
Helms

[11] Patent Number: 5,647,501
[45] Date of Patent: Jul. 15, 1997

[54] COMPOSITE LID FOR CONTAINER

[75] Inventor: Charles R. Helms, Malvern, Pa.

[73] Assignee: Double "H" Plastics, Inc., Warminster, Pa.

[21] Appl. No.: 492,215

[22] Filed: Jun. 19, 1995

[51] Int. Cl.$^6$ .................................................. B65D 43/08
[52] U.S. Cl. ................................... 220/780; 229/5.5
[58] Field of Search ............................ 220/306, 359, 220/780, 781, 796, 319; 215/232; 229/5.5, 5.7, 125.13

[56] References Cited

U.S. PATENT DOCUMENTS

| | | | |
|---|---|---|---|
| 2,893,456 | 7/1959 | Wallace | 220/306 |
| 2,984,382 | 5/1961 | Florsheim, Jr. | 220/306 |
| 3,397,814 | 8/1968 | Zackheim | 220/306 |
| 3,967,731 | 7/1976 | Boduch | 220/306 X |
| 4,299,350 | 11/1981 | Woerz | 229/5.5 |
| 4,438,864 | 3/1984 | Helms | 229/5.5 X |
| 4,560,082 | 12/1985 | Sutch | 220/306 X |

FOREIGN PATENT DOCUMENTS 2130565  6/1984  United Kingdom ................. 220/306

*Primary Examiner*—Allan N. Shoap
*Assistant Examiner*—Nathan Newhouse
*Attorney, Agent, or Firm*—Richard W. Carpenter

[57] ABSTRACT

A composite lid for a container, which lid has a molded plastic rim that includes an outer vertically extending skirt connected to a radially inwardly spaced, inner, vertically extending flange with at least one weakened hinge area located therebetween, and a paperboard panel having a marginal area attached to a surface of the rim inner flange by insert injection molding.

20 Claims, 1 Drawing Sheet

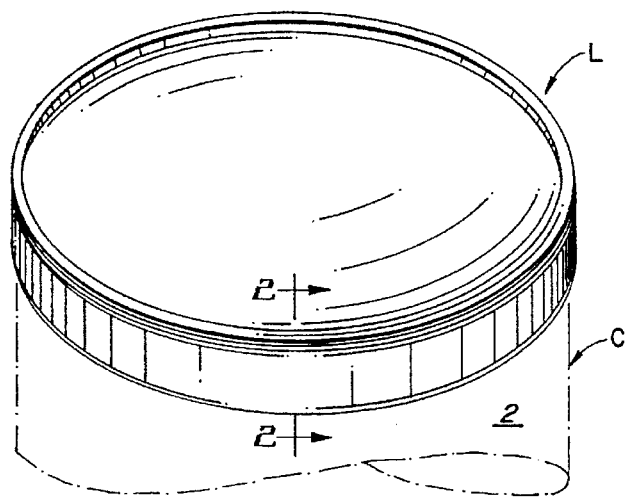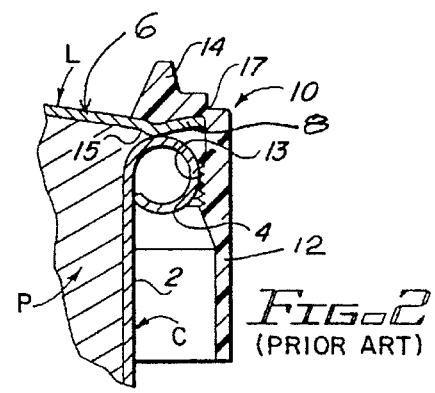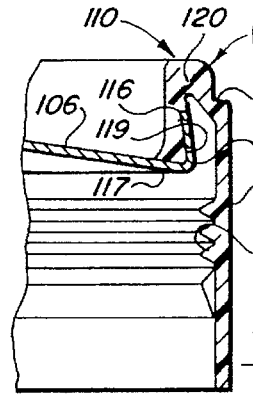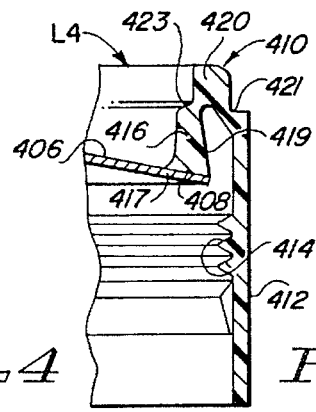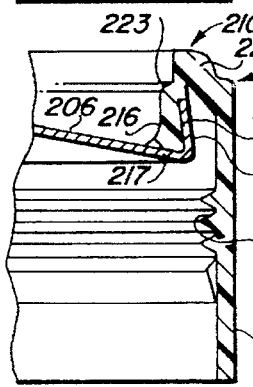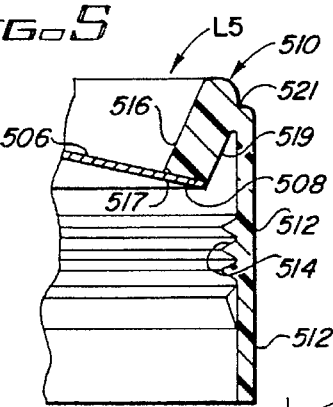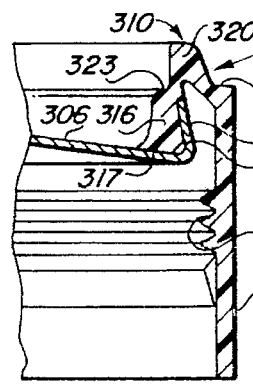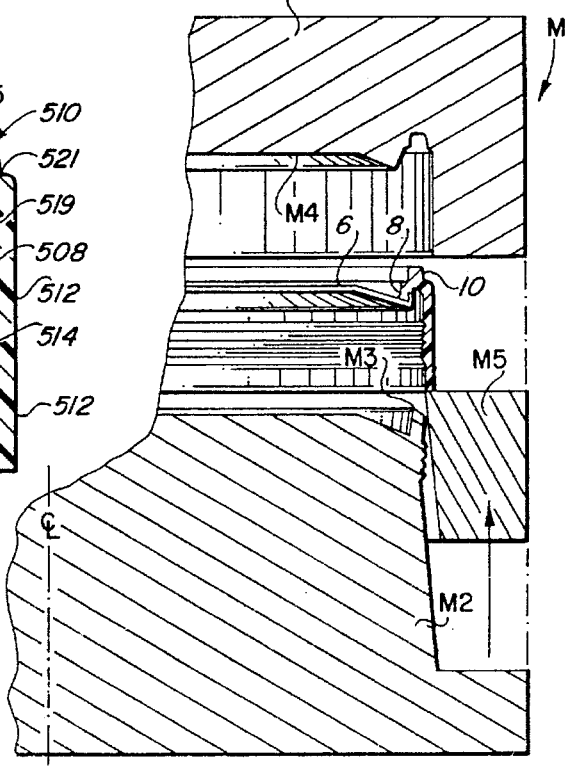

COMPOSITE LID FOR CONTAINER

BACKGROUND OF THE INVENTION

1. Field of the Invention

This invention relates to container lids and, more particularly, to a composite paperboard and plastic lid for a consumer size container of the type commonly used for the packaging of ice cream, yogurt, and similar products.

2. Description of the Background Art

A background art search directed to the subject matter of this invention conducted in the United States Patent and Trademark Office disclosed the following United States Letters Patent:

| | | | |
|---|---|---|---|
| 3,780,559 | 3,836,063 | 3,868,893 | 3,869,234 |
| 3,931,385 | 3,973,689 | 4,001,471 | 4,020,140 |
| 4,025,255 | 4,078,037 | 4,096,963 | 4,111,622 |
| 4,123,214 | 4,131,212 | 4,138,959 | 4,149,838 |
| 4,211,336 | 4,230,659 | 4,238,047 | 4,331,356 |
| 4,351,436 | 4,360,121 | 4,401,231 | 4,401,248 |
| 4,418,834 | 4,453,630 | 4,456,146 | 4,489,832 |

None of the patents uncovered in the search discloses a composite lid for a container, which lid includes a molded plastic rim having an outer vertically extending skirt connected to a radially inwardly spaced, inner, vertically extending flange, with at least one weakened hinge area therebetween, and a paperboard panel having a marginal area attached to a surface of the rim inner flange by insert injection molding.

SUMMARY OF THE INVENTION

It is a primary object of the invention to provide an improved composite container lid including hinge means that allows the lid to flex in order to minimize the chance of the lid rim being subject to fracture when the container is filled with a frozen product and dropped on a hard surface.

Another object of the invention is the provision of a lid of the type described which includes a paperboard panel having a marginal area attached to a plastic rim by insert injection molding in a way that allows the lids to be stacked when warm or cool.

Yet another object of the invention is to provide a lid of the type described wherein the design of the molded plastic rim limits the doming of the paperboard panel which is caused by the shrinkage of the rim during cooling.

A more specific object of the invention is the provision of a container composite lid with a molded plastic rim, having an outer vertically extending skirt connected to an inner vertically extending flange spaced radially inward therefrom, with at least one weakened hinge area therebetween, and a paperboard panel having a marginal area attached to a surface of the rim inner flange by insert injection molding.

These and other objects of the invention will be apparent from an examination of the following description and drawings.

BRIEF DESCRIPTION OF THE DRAWINGS

FIG. 1 is an isometric view of a container lid of the type currently in use;

FIG. 2 is a partial, vertical, sectional view taken on line 2—2 of FIG. 1;

FIG. 3 is a view similar to that of FIG. 2, but showing an area of a current lid that is vulnerable to fracture when an attached container filled with a frozen product, such as ice cream, is dropped;

FIG. 4 is a view similar to that of FIG. 2, but illustrates a form of the present invention;

FIGS. 5–8 are views similar to that of FIG. 4, but illustrate other modified forms of the present invention; and FIG. 9 is a schematic view illustrating a mold arrangement of the type employed to form the lid of the present invention.

It will be understood that, for purposes of clarity, certain elements may have been omitted from certain views where they are believed to be illustrated to better advantage in other views.

DESCRIPTION OF THE PREFERRED EMBODIMENT

Referring now to the drawings for a better understanding of the invention, in FIGS. 1–3 there is illustrated the current type of container composite lid with paperboard panel and plastic rim attached to each other by insert injection molding.

As best seen in FIGS. 2 and 3, a generally cylindrical container C is capped by a removable composite lid L. The container has a slightly tapered side wall 2 with a rolled upper rim or lip 4 at the upper edge thereof. The container is a paperboard container of the type commonly used for the packaging of frozen products, such as ice cream or yogurt indicated at P.

The lid L includes a paperboard panel 6 having a marginal portion 8 attached to a downwardly facing surface 15 of a plastic rim inner horizontal flange 14 that extends radially inward from the upper end of an integral, outer, vertical skirt 12.

The paperboard panel is attached to the plastic rim in an insert injection molding process that is illustrated in FIG. 9 and described in greater detail later in the specification.

The juncture, indicated at 17, of the rim inner flange 14 and the outer skirt 12 is often vulnerable to fracture when an attached container, filled with a frozen product, is dropped on a hard surface. This is because the marginal portion 8 of the paperboard panel 6, which is attached to the underside or downwardly facing surface of the inner flange, extends all the way to the corner of the rim where the outer skirt and inner flange join. The marginal edge of the paperboard panel, when extended all the way to the rim corner, interferes with the natural ability of the plastic rim to absorb impacts.

The design and construction of the lid of the present invention overcomes this problem as well as other problems associated with the design of most of the composite lids currently in use with conventional ice cream and yogurt containers.

One form of the present invention is illustrated in FIG. 4 of the drawings. In this embodiment a paperboard panel 106, having a marginal portion 108, is attached to the rim 110 of a lid L1.

The lid L1 includes a generally vertically extending outer skirt 112, with internal sealing beads 114, and a generally vertically extending inner skirt 116, which is spaced radially inward from, and concentric with, the outer skirt 112.

Inner flange 116 has a downwardly facing horizontal surface 117 and a radially outwardly facing vertical surface 119. The inner flange and outer skirt may be connected to each other by a generally transversely extending, integral bridge 120.

As best seen in FIG. 4, rim 110 has a relatively thin, weakened, hinge area 121 which is located between the outer end of the bridge 120 and the upper end of the skirt 112.

The arrangement of the outer skirt 112, the inner flange 116, and the bridge 120 with the weakened hinge area 121 of the present invention is unlike any of the lid rim arrangements known to be in the prior art and has several advantages over the related composite lid prior art constructions of the type currently in use.

The design of the rim 110, including the hinge feature 121 which allows the inner flange 112 and the outer skirt 112 to move or flex relative to each other, has several advantages that are important both during production of the lid and after production, when the lid is used to close or cap a container In the production of current lids of this type, the lid skirt must be molded in an outwardly flared or toed-out position, so that normal shrinkage will cause the skirt to assume a vertical position when cooled. Consequently, it is necessary to wait until the lids have cooled and attained a proper stackable profile before packing.

The unique design of the present invention insures that the shrinkage factor of the inner flange outer end will match that of the outer skirt. This limits the rotational movement or toe-in to the inner flange alone. The angle of the lid outer rim can then remain unchanged during molding and cooling. This allows the immediate stacking of lids directly in shipping containers as soon as they are removed from the mold, even though the lids may still be warm.

The previously described movement of the rim inner flange relative to the outer skirt also appreciably minimizes undesirable doming of the lid paperboard panels during manufacture.

The most important advantage of the design of the present invention, however, is that, with the outer skirt 112 and the inner flange 116 spaced from each other, the marginal area 108 of the paperboard 106 can be attached to the inner flange 116, so that it is spaced from the corner of the rim, where it tends to cause the rim to fracture when a container filled with a frozen product is dropped, as illustrated in FIGS. 1 and 2.

In the embodiment of the invention illustrated in FIG. 4, the marginal portion 108 of paperboard panel 106 of lid L1 is attached to the radially outwardly facing vertical surface 119 of inner flange 116.

The apparatus for forming this type of lid is illustrated in FIG. 9. A paperboard panel 106 having a marginal portion 108 is placed in the cavity of an injection type mold M between the upper section M1 and the core M2. As the mold is closed a lip or projection M3 engages the panel marginal portion 108 and folds it upwardly, so that when molten plastic is injected into the mold to form the rim 110, the panel marginal portion will be attached to the inner flange vertical surface 119.

In FIGS. 5–8 slightly different embodiments of the invention are shown, but in each embodiment the rim includes a paperboard panel having a marginal portion attached to a rim inner flange which is spaced radially inward from an outer skirt member but connected thereto with a weakened hinge area therebetween.

In these views elements corresponding to elements of the previously described embodiment are identified by related numerals.

The only difference between the embodiment illustrated in FIG. 5 and that of FIG. 4 is that in the structure of the rim 210 of the lid L2, illustrated in FIG. 5, the weakened hinge area 223 is located between the inner end of the bridge 220 and the inner flange 216, rather that between the outer end of the bridge and the outer skirt, as in the case of lid L1.

In the embodiment illustrated in FIG. 6, the rim 310 of the lid L3 is provided with two separate weakened hinge areas.

One hinge area 321 is located between the outer end of the bridge 320 and the outer skirt 312, and the other hinge area 323 is located between the inner end of the bridge and the inner flange 316.

In the embodiment illustrated in FIG. 7 the rim 410 of the lid L4 is quite similar to that of lid L3, illustrated in FIG. 6. The rim 410 of lid L4 also has two hinge areas 421 and 423, but the difference therebetween is that in the embodiment illustrated in FIG. 7 the marginal portion 408 of the paperboard panel 406 is attached to the downwardly facing horizontal surface 417 of inner flange 416, rather than to an outwardly facing vertical surface.

In the embodiment of the invention illustrated in FIG. 8, the rim 510 has no bridge, but has an outer skirt 512 connected directly to an inner flange 516 with a weakened hinge area 521 therebetween. In this embodiment, like that of FIG. 7, the marginal portion 508 of paperboard panel 506 is attached to the downwardly facing horizontal surface 517 of inner flange 516.

Although in the drawings of the present application both the lid and the container to which it is attached are shown as being round, the invention is equally applicable to lids and containers that are not round. They can be of other contours, such as oval or rectangular with rounded corners.

Thus, it should be understood that in every embodiment of the present invention the composite lid includes a molded plastic rim having an outer vertically extending skirt connected to a radially inwardly spaced, inner, vertically extending flange, with at least one weakened hinge area therebetween, and a paperboard panel having a marginal area attached to a surface of the rim inner flange by insert injection molding.

What is claimed is:

1. A reclosable, composite, paperboard and plastic lid for a container having a peripheral rim at an upper edge thereof, said lid comprising:

(a) a molded plastic rim including:
      (i) a generally cylindrical, vertically extending, outer skirt member;
      (ii) a generally cylindrical, vertically extending, inner flange member spaced radially inward from said outer skirt member;
      (iii) an annular, generally transversely extending, integral bridge connecting adjacent upper ends of said outer skirt and inner flange members;
   (b) a relatively thin, flat, circular, paperboard panel suspended below upper ends of said flange and skirt members by said flange member and being free from attachment to said skirt member;
   (c) said paperboard panel having only a marginal portion attached to a lower surface of said rim inner flange member by insert injection molding, so that said paperboard panel will not be distorted by shrinkage of said flange member as it cools;
   (d) a relatively thin weakened hinge area located between said bridge and at least one of said flange and skirt members so as to allow relative movement between said panel and said skirt member both during manufacture of said lid and after said lid has been applied to a filled container.

2. A composite lid according to claim 1, wherein said rim weakened hinge area is located between said bridge and said outer skirt member.

3. A composite lid according to claim 1, wherein said rim weakened hinge area is located between said bridge and said inner flange member.

4. A composite lid according to claim 1, wherein said rim weakened hinge area is located between said bridge and said outer skirt member, and wherein said rim includes another weakened hinge area located between said bridge and said inner flange member.

5. A composite lid according to claim 1, wherein said paperboard panel marginal portion is folded upwardly and attached to a radially outwardly facing surface of said rim inner flange member.

6. A composite lid according to claim 1, wherein said paperboard panel marginal portion is attached to a downwardly facing surface of said rim inner flange member.

7. A reclosable, composite, paperboard and plastic lid for a container having a peripheral rim at an upper edge thereof, said lid comprising:

(a) a molded plastic rim including:

(i) a generally vertically extending outer skirt member;

(ii) a generally vertically extending inner flange member spaced radially inward from said outer skirt member;

(iii) a generally transversely extending integral bridge connecting adjacent upper ends of said outer skirt and inner flange members;

(b) a relatively thin, flat, paperboard panel suspended below upper ends of said flange and skirt members by said flange member and being free from attachment to said skirt member;

(c) said paperboard panel having only a marginal portion attached to a lower surface of said rim inner flange member by insert injection molding so that said paperboard panel will not be distorted by shrinkage of said flange member as it cools;

(d) a relatively thin weakened hinge area located between said bridge and at least one of said flange and skirt members so as to allow relative movement between said panel and said skirt member both during manufacture of said lid and after said lid has been applied to a filled container.

8. A composite lid according to claim 7, wherein said rim weakened hinge area is located between said bridge and said outer skirt member.

9. A composite lid according to claim 7, wherein said rim weakened hinge area is located between said bridge and said inner flange member.

10. A composite lid according to claim 7, wherein said rim weakened hinge area is located between said bridge and said outer skirt member, and wherein said rim includes another weakened hinge area located between said bridge and said inner flange member.

11. A composite lid according to claim 7, wherein said paperboard panel marginal portion is folded upwardly and attached to a radially outwardly facing surface of said rim inner flange member.

12. A composite lid according to claim 7, wherein said paperboard panel marginal portion is attached to a downwardly facing surface of said rim inner flange member.

13. A composite lid according to claim 7, wherein said paperboard panel, said rim flange member, bridge, and skirt member are so positioned that no part of said lid need be inserted into the interior of a container, when said lid is applied thereto.

14. A reclosable, composite, paperboard and plastic lid for a container having a peripheral rim at an upper edge thereof, said lid comprising:

(a) a molded plastic rim including:

(i) a generally vertically extending outer skirt member;

(ii) a generally vertically extending inner flange member spaced radially inward from said outer skirt member;

(iii) an annular, generally transversely extending bridge connecting adjacent upper ends of said outer skirt and inner flange members;

(b) a relatively thin, flat, paperboard panel suspended below upper ends of said flange and skirt members by said flange member and being free from attachment to said skirt member;

(c) said paperboard panel having only a marginal portion attached to a lower surface of said rim inner flange member by insert injection molding so that said paperboard panel will not be distorted by the shrinkage of said flange member as it cools after molding;

(d) a relatively thin weakened hinge area located between said bridge and at least one of said flange and skirt members so as to allow relative movement between said panel and said skirt member both during manufacture of said lid and after said lid has been applied to a filled container.

15. A composite lid according to claim 14, wherein said paperboard panel marginal portion is folded upwardly and attached to a radially outwardly facing surface of said rim inner flange member.

16. A composite lid according to claim 14, wherein said paperboard panel marginal portion is attached to a downwardly facing surface of said rim inner flange member.

17. A composite lid according to claim 14, wherein said panel and rim are round.

18. A composite lid according to claim 14, wherein said panel and rim are oval.

19. A composite lid according to claim 14, wherein said panel and rim are rectangular with rounded corners.

20. A composite lid according to claim 14, wherein said paperboard panel, said rim flange member and skirt member are so positioned that no part of said lid need be inserted into the interior of a container, when said lid is applied thereto.

* * * * *